United States Patent [19]
Shacklette et al.

[11] Patent Number: 5,850,498
[45] Date of Patent: Dec. 15, 1998

[54] LOW STRESS OPTICAL WAVEGUIDE HAVING CONFORMAL CLADDING AND FIXTURE FOR PRECISION OPTICAL INTERCONNECTS

[75] Inventors: Lawrence W. Shacklette; Kelly M. T. Stengel, both of Maplewood; Louay Eldada, Rockaway; James T. Yardley, Morristown; Chengzeng Xu, Succasunna, all of N.J.

[73] Assignee: AlliedSignal Inc., Morris Township, N.J.

[21] Appl. No.: 838,342

[22] Filed: Apr. 8, 1997

[51] Int. Cl.$^6$ ...................................................... G02B 6/10
[52] U.S. Cl. .............................................................. 385/129
[58] Field of Search ..................................... 385/129, 130, 385/131, 132, 147, 50

[56] References Cited

U.S. PATENT DOCUMENTS

| | | | |
|---|---|---|---|
| 3,800,414 | 4/1974 | Shattes et al. | 29/599 |
| 4,609,252 | 9/1986 | Wong et al. | 350/96.12 |
| 4,844,578 | 7/1989 | Pierini et al. | 385/128 |
| 5,024,505 | 6/1991 | Junji et al. | 350/96.22 |
| 5,136,682 | 8/1992 | Moyer et al. | 385/141 |
| 5,150,507 | 9/1992 | Goela et al. | 29/460 |
| 5,265,184 | 11/1993 | Lebby et al. | 385/132 |
| 5,309,537 | 5/1994 | Chun et al. | 385/59 |
| 5,375,184 | 12/1994 | Sullivan | 385/129 |
| 5,390,275 | 2/1995 | Lebby et al. | 385/132 |
| 5,649,045 | 7/1997 | Fjare et al. | 385/145 |

*Primary Examiner*—Akm E. Ullah
*Attorney, Agent, or Firm*—John A. Squires; Colleen D. Szuch

[57] ABSTRACT

The invention provides a low stress optical waveguide assembly wherein one or more waveguide cores have a conformal cladding in register the waveguide core. The core and cladding are preferably lithographically formed on a substrate. A connector assembly provides for the precision interconnection of mating arrays of parallel optical waveguides. The connector assembly has a base with several parallel channel walls cut along a surface of the base. A waveguide assembly is positioned on the base. The waveguide assembly comprises a substrate and one or more transparent, polymeric waveguides on and raised from a surface of the substrate. A conformal cladding is in register with the waveguide core. Such conformal cladding contributes to a reduction in waveguide stress. The waveguide assembly is positioned on the base such that each of the waveguides is set in one of the channels and contacts the walls of the channel. A cover plate holds the waveguide assembly on the base.

40 Claims, 6 Drawing Sheets

LOW STRESS OPTICAL WAVEGUIDE HAVING CONFORMAL CLADDING AND FIXTURE FOR PRECISION OPTICAL INTERCONNECTS

BACKGROUND OF THE INVENTION

The present invention relates to waveguides, or more particularly to low internal stress optical waveguides and a connector assembly for the precision interconnection of mating arrays of parallel optical waveguides. The optical waveguides are preferably photolithographically formed on substrates.

It is known in the art to photolithographically produce optical waveguides on a substrate. Such optical waveguides connect optical information processing devices or connect such devices and other optical communication links such as glass optical fibers. Waveguides may also be used to create passive optical devices such as splitters, combiners, couplers, routers and the like. In commonly used applications, waveguides are densely packed on substrates and extremely small dimensions are generally required. The transverse dimension of such waveguides typically range from about 5 µm to about 100 µm, while the space between guides can be as little as 3 µm. It is known in the art to produce waveguides with UV photopatterned polymeric materials. In this regard, see U.S. Pat. No. 4,609,252 which is incorporated herein by reference. An optical waveguide typically comprises a transparent core capable of directing light signals therethrough, and a reflective cladding comprising a material having a lower index of refraction than the core material surrounding the core. Waveguides may be constructed as single monolithic structures lithographically on a substrate or may comprise a series of parallel waveguides on a ribbon-like substrate. Heretofore, one or more cores were first lithographically formed on a substrate and then a layer of cladding material was spread over all of the cores. It has been found that this manufacturing method produces undue stress and shearing forces on the waveguide cores either due to temperature induced temperature change or to contraction of the cladding material as it cures. These forces on the core generally result in defects within the core which scatter light, resulting in increased loss. It has now been found that when a thin cladding is applied in substantially conforming registration around the sides of each individual core such that each core and cladding is spaced from the next, the waveguides undergo much less stress. This stress can be further reduced by employing dimensionally stable cladding materials which have minimal shrinkage during cure. Soft materials which readily deform during cure also minimize stress. Low stress and low optical loss are attained when the cores and cladding, comprising materials having the glass transition temperatures indicated herein are structured in a manner such that the cladding is thin in comparison to the core. Lithographically formed optical waveguides employing polymeric materials having low optical loss, good long term and short term stability, good flexibility and reduced stress or crack induced optical scattering loss are desired. The polymeric materials described herein have short term thermal stability at temperatures above 200° C. for device integration and packaging, good long term stability at 120° C. for long term operation, low absorption and scattering loss at application wavelengths, flexibility to facilitate device designs in different geometry, precisely controllable refractive indexes for mode and numeric aperture control, and compatibility with existing technologies. Waveguides having low propagation loss, generally less than 0.1 dB/cm for light of a wavelength in the range of about 780 to about 1550 nm are attained.

It is also often necessary to make an optical interconnection between such waveguides and other waveguides, devices and/or optical fibers. These interconnections require a precision alignment at the interface between the devices. This is difficult to achieve when the device structures have different geometries. Moreover, no matter how well made, such interconnects result in loss of optical power. A further complication is that the alignment, once accomplished, is difficult to maintain under conditions of high vibration. It is therefore generally desired to minimize the number of interconnects, to facilitate the precision alignment at any necessary interconnects and to ensure the maintenance of alignment over time.

The present invention provides for the precision alignment of a waveguide array with another corresponding waveguide array or light transmitting device or fiber array. Such a structure serves as an optical interconnect between light transmitting devices. The device may be a printed waveguide structure which, when fabricated on a flexible substrate may include a flexible ribbon-type interconnect which can be run directly to a connector or to another device. The device itself may be laminated to a rigid structure such as a sheet of rigid plastic or glass with the flexible ribbon interconnects allowed to extend beyond the substrate and which can be fed to an optical connector or other interface between devices.

U.S. Pat. No. 4,111,522 discloses the alignment of glass fibers in a fiber-to-fiber connector. The foregoing does not suggest the aligned attachment of photolithographically formed waveguides on substrates nor a de-mateable connector for the interfacing of standing rib waveguide to conventional glass or polymer fiber. U.S. Pat. No. 5,375,184 shows a waveguide alignment device wherein a single waveguide is aligned with another single waveguide by means of mating guides. U.S. Pat. No. 5,024,505 shows a splicer for several individual strands of circular cross-section optical fibers.

It would be desirable to provide a means of connecting two or more ribbons of densely packed, small diameter, substantially parallel, photolithographically formed waveguides, especially rectangular cross-section waveguides on substrates. It has now been found that a good optical connection between waveguides can be achieved by mating the ends of waveguides to be connected in the base portion of a coupler having precision grooves. The ends of the waveguides are self-aligned by abutting them against the walls of the grooves. Once aligned, a cover plate maintains them in place.

DESCRIPTION OF THE INVENTION

The invention provides an optical waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core.

The invention also provides a waveguide connector assembly which comprises (a) a base having at least one channel defined by walls cut along a surface of the base;

(b) a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core; the waveguide assembly being positioned on the base such that each waveguide is positioned in one of the channels and contacts the walls of the channel at two or more points;

(c) a cover plate on the waveguide assembly.

The invention further provides a method for aligning a first waveguide assembly to a second waveguide assembly which comprises (a) providing a waveguide connector comprising a base having a plurality of substantially parallel channels defined by walls cut along a surface of the base and a cover plate on the base over the channels;

(b) providing first and second waveguide assemblies, each of which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) positioning the first and second waveguide assemblies on the base such that each waveguide is positioned in one of the channels and contacts the opposing walls of the channel at two or more points, and such that each waveguide on the first waveguide assembly has an end which is aligned with a corresponding end of a waveguide on the second waveguide assembly.

The invention also provides a method for aligning a waveguide assembly to an optical fiber assembly which comprises (a) providing a waveguide connector comprising a base having a plurality of substantially parallel channels defined by walls cut along a surface of the base and a cover plate on the base over the channels;

(b) providing a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) providing an optical fiber assembly which comprises a plurality of attached optical fibers;

(d) positioning the waveguide assembly and the optical fiber assembly on the base such that each waveguide and optical fiber is positioned in one of the channels and contacts the opposing walls of the channel at two or more points, and such that each of the waveguides on the waveguide assembly has an end which is aligned with a corresponding end of an optical fiber on the optical fiber assembly.

The invention still further provides a method for aligning a first waveguide assembly to a second waveguide assembly which comprises (a) providing first and second waveguide connectors each comprising a base having a plurality of substantially parallel channels defined by walls cut along a surface of the base and a cover plate on the base over the channels;

(b) providing first and second waveguide assemblies, each of which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) positioning the first and second waveguide assemblies respectively on the base of the first and second waveguide connectors such that each of the waveguides is positioned in one of the channels and contacts the opposing walls of the channel at two or more points; and (d) attaching the first waveguide connector to the second waveguide connector such that each of the waveguides on the first waveguide assembly has an end which is in substantially co-linear alignment with a corresponding end of a waveguide on the second waveguide assembly.

The invention also provides a method for aligning a first waveguide assembly at least one optical fiber, which comprises (a) providing first and second waveguide connectors each comprising a base having a plurality of substantially parallel channels defined by walls cut along a surface of the base and a cover plate on the base over the channels;

(b) providing a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) providing an optical fiber assembly which comprises at least one optical fiber;

(d) positioning the waveguide assembly respectively on the base of the first waveguide connector such that each waveguide is positioned in one channel and contacts the opposing walls of the channel at two or more points;

(e) positioning the optical fiber assembly respectively on the base of the second waveguide connector such that each optical fiber is positioned in one channel and contacts the walls of the channel at two or more points; a (f) attaching the first waveguide connector to the second waveguide connector such that each waveguide on the waveguide assembly has an end which is in substantially co-linear alignment with a corresponding end of an optical fiber on the optical fiber assembly.

The compositions used to form each of the cladding and core comprise a photopolymerizable compound and a photoinitiator. The photopolymerizable compound used to form each of the cladding and core may be a monomer, oligomer or polymer which is an addition polymerizable, nongaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. In the preferred embodiment, at least one of said polymerizable compounds contains at least two ethylenically unsaturated groups. The photopolymerizable compounds are chosen such that after exposure they yield the below described Tg and refractive index. Multifunctional acrylate monomers are preferred.

The generalized structure of the multifunctional acrylates is given below:

For the core, m preferably ranges from 1 to about 6; $R_2$ is H or $CH_3$, and $R_1$ is a linkage of aliphatic, aromatic or aliphatic and aromatic mixed organic molecular segments. Preferably $R_1$ is an alkylene, alkylene oxide, arylene oxide, aliphatic polyether or polyester moiety and $R_2$ is H. To ensure solvent resistance of the cured film and high contrast photolithography, crosslinked polymers and therefore multifunctional acrylate monomers ($m \geq 2$) are preferred. One feature of the invention is to reduce stress induced scattering optical loss of the final waveguiding device by using flexible, low glass transition temperature (Tg) polymers. It is known in the art that glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with $1 \leq m \leq 3$, preferably m=2, and long linkage segments between two ethylenically unsaturated functionalities are preferred. For this invention, long linkage segments are those which have an average molecular chain length of at least about 4 carbon atoms or larger and preferably 6 or larger. Suitable flexible linkage structures include alkylenes with chain length larger than about 3 carbon atoms, poly(ethylene oxide), poly(propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize. Suitable substitutents nonexclusively include alkyl, aryl, alkoxy and sulfoxide groups, etc. To ensure high resistance to thermal degradation and discoloration, thermally stable molecular structures of $R_1$ are preferred. Such $R_1$ segments should be free of thermally susceptible moieties such as aromatic urethane and amide groups. To ensure low birefringence, $R_1$ linkages with low stress optic coefficient and optical polarizability are preferred.

For the cladding, the acrylate is also as described above, however, the average molecular chain length between ethylenically unsaturated functionalities is preferably about 6 carbon atoms or longer, preferably 8 or longer and more preferably 12 or longer. Suitable flexible linkage structures include alkylenes with chain length larger than 6 carbon atoms, poly(ethylene oxide), poly(propylene oxide) and ethoxylated bisphenol A.

Preferred polymerizable components for both the cladding and the core are esters and partial esters of acrylic acid and of aromatic and aliphatic polyols containing preferably 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Preferred multifunctional acrylate oligomers include, but are not limited to acrylated epoxies, acrylated polyurethanes and acrylated polyesters. Preferred photopolymerizable compounds are aryl acrylates. Illustrative of such aryl acrylate monomers are aryl diacrylates, triacrylates and tetraacrylates as for example di, tri and tetraacrylates based on benzene, naphthalene, bisphenol-A, biphenylene, methane biphenylene, trifluoromethane biphenylene, phenoxyphenylene and the like. The preferred aryl acrylate monomers are multifunctional aryl acrylates and more preferred aryl acrylate monomers are di, tri and tetra acrylates based on the bisphenol-A structure. Most preferred aryl acrylate monomers are alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Preferred polymerizable components are monomers having the structure (I):

In the preferred embodiment, for the core, n is about 10 or less, preferably about 4 or less and most preferably about 2 or less. In the preferred embodiment, for the cladding, n is about 2 or more, preferably about 4 or more and most preferably about 10 or more. Also useful are acrylate containing copolymers which are well known in the art. In the preferred embodiment, the cladding layer comprises a polymerizable component which has the ethoxylated bisphenol-A disacrylate structure (I) shown above wherein $1 \leq n \leq 20$, preferably $4 \leq n \leq 15$, and more preferably $8 \leq n \leq 12$. In the most preferred embodiment of the invention, the second photosensitive composition is miscible with the polymerized first photosensitive composition at their interface.

When selecting the photopolymerizable compounds to be used in each of the core and the cladding, it is important that the core which results after full polymerization has a higher refractive index than that of the cladding after polymerization. Preferably the core has a refractive index in the range of from about 1.3 to about 1.6, or more preferably from about 1.45 to about 1.56. Preferably the cladding has a refractive index in the range of from about 1.3 to about 1.58, or more preferably from about 1.42 to about 1.55. Although the cladding and core may be comprised of structurally similar compositions, it is clear that in order for the cladding to have a refractive index which is lower than the refractive index of the core, they must have different chemical compositions for any individual application. In addition, if the chosen substrate has a refractive index which is less than that of the core, then a buffer layer is required and the buffer, as described below, must have a refractive index which is lower than that of the core.

It is a most preferred feature of the present invention that the photopolymerizable compounds to be used in the waveguide core produce a core which after polymerization has a glass transition temperature of about 80° C. or less and preferably about 50° C. or less. It is a most preferred feature of the present invention that the photopolymerizable compounds to be used in the waveguide cladding produce a cladding which after polymerization has a glass transition temperature of about 60° C. or less, preferably about 40° C. or less and more preferably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light transmissive element of light transmissive devices may be used. The amount of photopolymerizable compound is generally used in an amount of from about 35 to about 99.9% by weight of the composition. In the preferred embodiment, the photopolymerizable compound is present in the overall composition in an amount of from about 80% to about 99.5% by weight, preferably from about 95 to about 99.5% based on the weight of the overall composition.

Each light sensitive composition further comprises at least one free radical generating photoinitiator which photolytically generates free radicals. Usually the photoinitiator is a free radical generating addition polymerization initiator activated by actinic light and is preferably thermally inactive near room temperature (e.g. from about 20° C. to about 80° C.) Any photoinitiator which is known to photopolymerize acrylates can be used. Preferred photoinitiators nonexclusively include those described in U.S. Pat. No. 4,942,112, quinoxaline compounds as described in U. S. Pat. No. 3,765,898; the vicinal polyketaldonyl compounds in U. S. Pat. No. 2,367,660; the alpha-carbonyls in U.S. Pat. Nos. 2,367,661 and 2,367,670; the acyloin ethers in U. S. Pat. No. 2,448,828; the triarylimidazolyl dimers in U. S. Pat. No. 3,479,185; the alpha-hydrocarbon substituted aromatic acyloins in U. S. Pat. No. 2,722,512; polynuclear quinones in U. S. Pat. Nos. 2,951,758 and 3,046,127; and s-triazines in U. S. Pat. No. 4,656,272 which are incorporated herein by reference.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Preferred photoinitiators are 1-hydroxy-cyclohexyl-phenyl ketone (Irgacure 184), benzoin, benzoin ethyl ether, benzoin isopropyl ether, benzophenone, benzodimethyl ketal (Irgacure 651), α,α-diethyloxy acetophenone, α,α-dimethyloxy-α-hydroxy acetophenone (Darocur 1173), 1-[4-(2-hydroxyethoxy)phenyl]-2-hydroxy-2-methyl-propan-1-one (Darocur 2959), 2-methyl-1-[4-methylthio)phenyl]-2-morpholino-propan-1-one (Irgacure 907), 2-benzyl-2-dimethylamino-1-(4-morpholinophenyl)-butan-1-one (Irgacure 369), poly{1-[4-(1-methylvinyl)phenyl]-2-hydroxy-2-methyl-propan-1-one} (Esacure KIP), [4-(4-methylphenylthio)-phenyl]phenylmethanone (Quantacure BMS), di-campherquinone. The most preferred photoinitiators are those which tend not to yellow upon irradiation. Such photoinitiators include benzodimethyl ketal (Irgacure 651), α,α-dimethyloxy-a-hydroxy acetophenone (Darocur 1173), 1-hydroxy-cyclohexyl-phenyl ketone (Irgacure-184), and 1-[4-(2-hydroxyethoxy)phenyl]-2-hydroxy-2-methyl-propan-1-one (Darocur 2959).

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more preferably from about 0.1% to about 6% and most preferably from about 0.5% to about 4% by weight based on the total weight of the composition.

Other additives may also be added to the photosensitive compositions depending on the purpose and the end use of the light sensitive compositions. Examples of these include antioxidants, photostabilizers, volume expanders, fillers such as for example silica, glass spheres and the like, dyes, free radical scavengers, contrast enhancers, nitrones and UV absorbers. Antioxidants include such compounds as phenols and particularly hindered phenols including Irganox 1010 from Ciba-Geigy; sulfides; organoboron compounds; organophosphorous compounds; N, N'-hexamethylenebis(3,5-di-tert-butyl-4-hydroxyhydrocinnamamide) available from Ciba-Geigy under the tradename "Irganox 1098". Photostabilizers and more particularly hindered amine light stabilizers include but are not limited to poly[(6-morpholino-s-triazine-2,4-diyl)[2,2,6,6,-tetramethyl-4-piperidyl)imino]-hexamethylene[2,2,6,6,-tetramethyl-4-piperidyl)imino)] available from Cytec Industries under the tradename Cyasorb UV3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and preferably from about 0.1% to about 1%. Preferably all components of the overall composition are in admixture with one another, and most preferably in a substantially uniform admixture.

In the preferred embodiment of the invention, the optical devices of this invention are formed by applying the first photosensitive composition onto the surface of a suitable substrate. The substrate may be any material on which it is desired to establish a waveguide including semiconductor materials such as silicon, silicon oxide, gallium arsenide, silicon nitride, glass, quartz, plastics, ceramics, crystalline materials and the like. The substrate may or may not contain other devices, either topographical features such as grooves or electrical circuits or electro-optic devices such as laser diodes. On substrates where the light transmissive region is an organic layer of lower refractive index than the substrate material, it is necessary to first form a layer of refractive index lower than the refractive index of the organic waveguide material. Such a layer is known in the art as a buffer layer and may be comprised of, for example, a semiconductor oxide, a lower refractive index polymer or a spin-on silicon dioxide glass material.

A film of the photosensitive compositions may be applied in a number of different ways known in the art, such as spin coating, dip coating, slot coating, roller coating, doctor blading, liquid casting or the like. Generally the first photosensitive composition is applied at a thickness of from about 1 micron to about 1 mm, preferably from about 5 microns to about 500 microns. Generally the second photosensitive composition is applied at a thickness of from at least about 1 micron, preferably at least about 3 microns.

Once the first photosensitive composition is formed onto the substrate in a thin or thick film, actinic radiation is directed onto the film in order to delineate the light transmissive region. That is, the position and dimensions of the light transmissive device is determined by the pattern of the actinic radiation upon the surface of the film on the substrate. The radiation pattern must be chosen so that the photopolymerizable composition is polymerized in the desired pattern and so that other regions of the film remain unreacted. The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art. Sources of actinic radiation and the wavelength of the radiation may vary widely, and any conventional wavelengths and sources can be used. It is preferable that the photochemical excitation be carried out with relatively short wavelength (or high energy) radiation so that exposure to radiation normally encountered before processing (e.g., room lights) will not prematurely polymerize the polymerizable material. Alternatively, the processing can utilize a multiphoton process initiated by a high intensity source of actinic radiation such as a laser. Thus, exposure to ultraviolet light (300–400 nm wavelength) is convenient. Also, exposure by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Electron beam or ion beam excitation may also be utilized. Exposure time normally varies from a few seconds to about 1 minute. Temperatures usually range from about 10° C. to about 60° C., however, room temperature is more preferred.

Control of the spatial profile of the actinic radiation, that is, where it falls on the layer of photopolymerizable material may be achieved by conventional methods. For example, in one conventional method, a mask bearing the desired light transmissive pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the light transmissive pattern onto the film. Another conventional method of spatial control is to use a source of actinic radiation which comprises a directed or focused beam such as a laser or electron beam. Such a beam intersects only a small area of the photo-polymerizable material film surface. The pattern of the desired light transmissive regions is achieved by moving this small intersection point around on the film surface either by scanning the beam in space or by moving the substrate so that the intersection point is changed relative to a stationary beam. These types of exposure using a beam source are known in the art as direct-write methods. By choosing the spatial characteristics of irradiation, it is possible to create light transmissive regions on the surface of the substrate and produce slab and channel waveguides. A slab waveguide is one in which the optical wave is confined only to the plane of the film. A channel waveguide is one in which the optical wave is also confined laterally within the film. A channel structure is necessary for many nonlinear and electro-optic devices because it allows the light to be directed to certain areas of the substrate as well as providing a mechanism for splitting, combining optical waves and coupling light from the waveguide to optical fibers.

After the photopolymerizable composition has been polymerized to form the predetermined pattern of the photopolymer on the surface of the substrate, the pattern is then developed to remove the nonimage areas and leave behind the predetermined pattern. Any conventional development method can be used, for example, flushing with a solvent for the unirradiated composition. Such solvents include polar solvents, such as alcohols and ketones. The most preferred solvents are acetone, methanol, propanol, tetrahydrofuran and ethyl acetate.

The next step in obtaining the device of the present invention is the formation of a cladding on the waveguide core. The cladding can be any material capable of keeping applied light in the core. The cladding is formed by applying a second photosensitive composition onto the surface of the first, imagewise polymerized photosensitive composition and exposed to form a cladding. The second photosensitive layer is imagewise exposed in registration with the core pattern and developed in a manner described above. The latter structure has a cladding which covers the top and sides of the core. It is advantageous since its core exhibits low internal stresses.

In another embodiment of the invention, the optical device has a buffer layer applied to the substrate prior to application of the first photosensitive composition. The buffer layer comprises a third photosensitive composition which has a similar Tg property as the second photosensitive but need not be the identical composition. The third photosensitive composition is applied onto the surface of the substrate and overall, or non-imagewise exposed to actinic radiation. The third photosensitive composition comprises the same component parts as the second photosensitive composition. The photopolymerizable materials and processing conditions are selected such that the Tg of the polymerized buffer ranges from about 60° C. or less, preferably about 40° C. or less and more preferably about 25° C. or less.

In one preferred embodiment, the first photosensitive composition need not be fully cured, but is only partially polymerized prior to applying the second photosensitive composition. Partially polymerized means that some acrylate groups are present after polymerization, i.e., not all acrylates are converted to saturated hydrocarbons. This means that more than 0% but less than 50% of the number of acrylate groups, preferably about 10% or more but less than about 30% of the acrylate groups remain unreacted prior to applying the second photosensitive composition. Partial polymerization of the first photosensitive composition layer prior to application of the second photosensitive composition layer, allows the two compositions to intermingle at their interface. This intermingling improves adhesion of the two layers.

After application of the second photosensitive composition, any remaining unpolymerized first photosensitive composition and the second photosensitive composition layers are subjected to a hard curing by a blanket or overall exposure to actinic radiation such that they are both substantially fully polymerized. In this manner, the core and cladding composition intermix at their interface and can be mixed in any desired proportions to fine tune the refractive indices of the cladding, core and the overall device and insure good adhesion between the layers by covalent bonding.

The method of this invention can be used for making a wide variety of optical elements. By using a suitable mask and by controlling the degree of collimation of the actinic radiation used for exposure, it is also possible to create arrays of micro-optical elements such as lenses or prisms which can be designed to transmit light in a direction roughly orthogonal to the substrate. Such optical element arrays find utility in application to backlights (e.g. for liquid crystal displays), projection systems, front or rear projection screens, diffusers, collimators, liquid crystal viewing screens, light directing arrays for collimators and lighting fixtures, exit signs, displays, viewing screens, displays for projection systems, and the like. For such application it is important to create an essentially cosmetically perfect device composed of individual elements which have sharp definition and smooth walls. The composition of the current invention can be used to enhance the critical aspects of definition and wall smoothness. The optical elements produced by the instant invention are determined to have an optical loss of about 0.1 or less and preferably about 0.05 or less 600 to 900 nm. In addition, the polymerized cladding, core and buffer layers have a Gardner index as described by ASTM D1544-80 of about 3 or less, preferably about 2 or less and more preferably about 1 or less.

Device testing and modeling suggest a device life time (time for 0.1 dB/cm loss) of more than 10 years at 120° C. (operation temperature) and more than 1 hour at 250° C. (device packaging temperature), allowing for application of devices applicable in the aerospace and military industries. Flexibility of the materials allows for fabrication of devices with desired bending angles. Cracking is also avoided even when the device is exposed to very high or very low temperatures. Good adhesion of the materials permits fabrication of robust devices on a variety of substrates without delamination even in some harsh environments such as high temperature and high humidity. Compatibility of device fabrication techniques with semiconductor industry allows for development of hybrid optoelectronic circuitry.

This invention has application in either multimode or single-mode waveguides. Single mode waveguides typically have a core ranging from about 1 to about 10 microns in lateral dimension and multimode waveguides typically have a core ranging from about 10 microns to about 1 mm in lateral dimension. For this invention the cladding is thin, having a thickness which ranges from about 1 micrometer to about 100 micrometers, preferably from about 3 micrometers to about 50 micrometers. More typically single mode waveguides have a cladding ranging from about 3 to about 10 microns while multimode waveguides typically have a cladding ranging from about 10 microns to about 30 microns. Importantly, the thickness of each cladding is not more than the thickness of each core.

Figure 1:
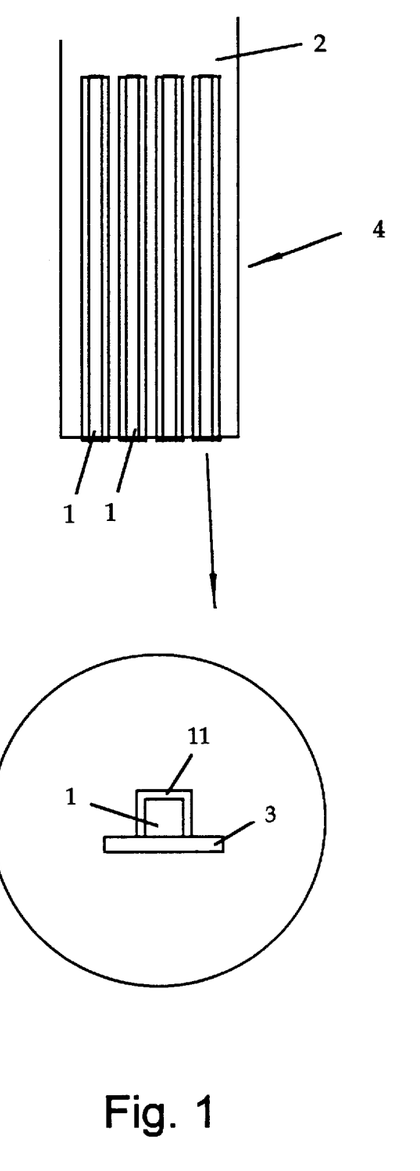
FIG. 1 shows top and cross sectional views of a ribbon of raised rib waveguides having conformal cladding.
Figure 1A:
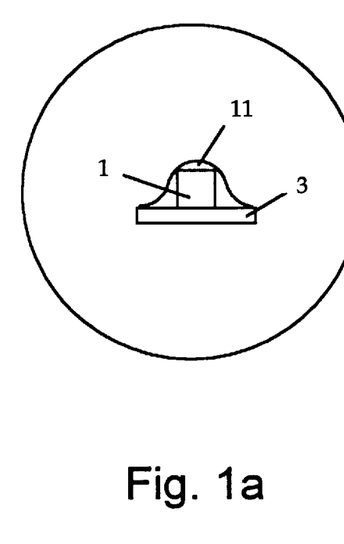
FIG. 1a shows a cross sectional view of a ribbon of raised rib waveguides having rounded conformal cladding following a Gaussian curve.

Guides may have any of a number of convenient cross-sectional shapes, such as circular, polygonal, square as seen as element 11 in FIG. 1, rectangular, trapezoidal, and rounded such as following a parabolic or Gaussian curve on the top and sides and flat at the bottom where they contact the substrate or buffer as shown as element 11 in FIG. 1*a*.

For purposes of this invention, a waveguide assembly is defined to mean an array of optical waveguides formed on a substrate. The invention additionally contemplates a connector and method whereby two waveguide assemblies are optically connected or whereby such a waveguide assembly is optically connected to an array of optical fibers. A preferred embodiment of the invention is shown in FIG. 1 which depicts an optical waveguide assembly or ribbon 4 consisting of four parallel waveguides including a core 1 and a conformal cladding 11 which are raised from a substrate 2 by optional underlying plateaus 3. In the preferred embodiment the waveguides are fabricated on or within substrate structure 2.

When a plateau is employed, it may be lithographically formed in a manner described above for the formation of the waveguides. In such a case, the waveguide comprising core and cladding is formed on the plateau after the plateau is formed on the substrate. It is preferred that each waveguide be positioned on its own discrete plateau. The waveguide is precision aligned with the raised plateau, preferably to a precision within about 10% of the width of the waveguide, more preferably within about 5% and most preferable within about 1%. The raised plateau is optically separate from to each of the waveguides by virtue of having a lower index of refraction, but is preferably an integral mechanical part of each waveguide itself. When the waveguide is formed on the plateau, the plateau preferably comprises a transparent polymer with an index of refraction which is less than that of the waveguide, such that light traveling within the waveguide remains confined within the waveguide. The alignment features of such a waveguide assembly consist of the sides of the plateaus and/or the sides of the cladding conforming to the sides of the core. When the edges of the plateaus are employed as the primary alignment feature, the alignment of the waveguides is critical upon the plateaus and requires that the ribbon be fabricated in a way which assures that the waveguides are well aligned (e.g., centered) on their respective plateaus. For a multimode waveguide with a diameter in the range from 50 to 100 microns, the alignment of the plateau with the waveguide is preferably less than about 10 microns, and is more preferably less than about 5 microns. When the primary alignment feature is the cladding, it is critical that the cladding be disposed symmetrically about the two sides of the core and have a substantially similar thickness about each of the two sides. The difference in thickness between the two sides is preferably less than about 20% of the average core width and more preferably less than about 10% of the average core width. The degree of registration of the core and cladding is preferably such that the offset between the lateral center of the core is less than 10% and more preferably less than 5% of the average width of the core. For the purpose of this invention, such a condition is denoted as being in substantially conforming registration.

In the preferred embodiment, the substrate 2 is composed of a flexible material such as a polymer film. Suitable polymeric films non-exclusively include those described above. In this case the structure can be flexed and bent as desired to achieve the necessary orientation for interconnection with another device.

Figure 2:
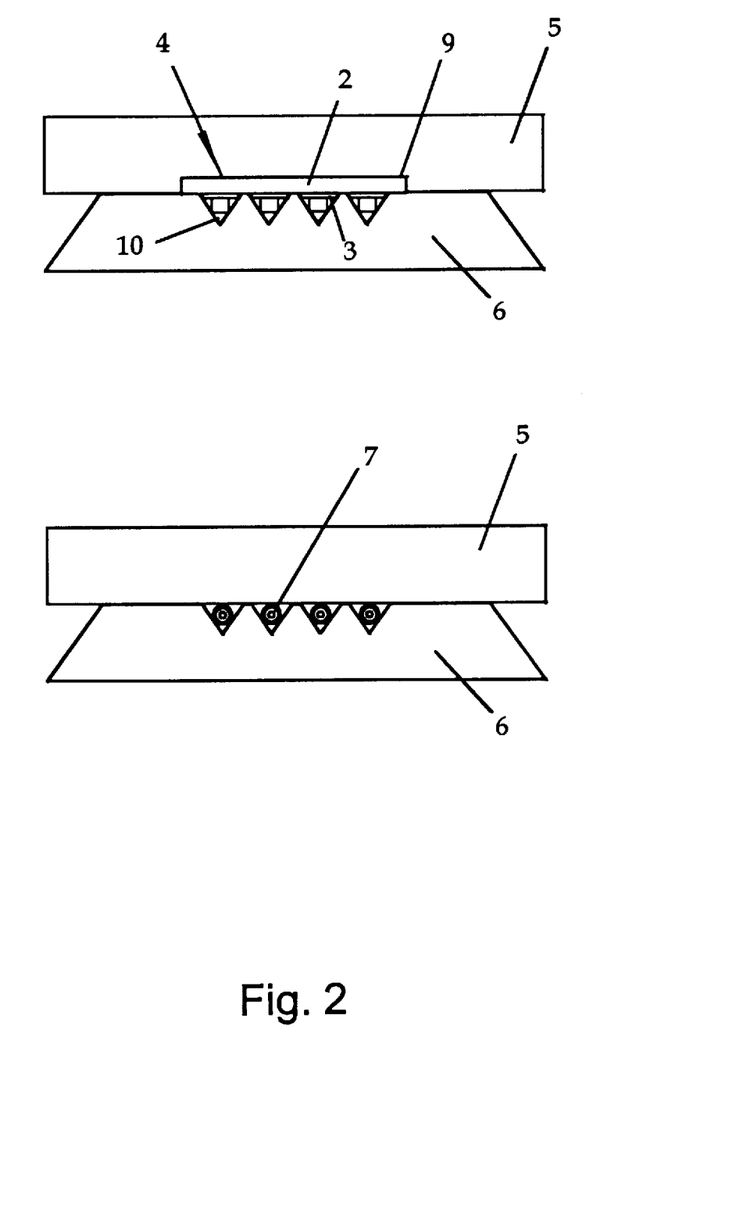
FIG. 2 shows a waveguide ribbon with discrete plateaus inserted into a connector alignment fixture.

An example of the utility of this invention in achieving an accurate alignment for a prospective interconnection is shown in FIG. 2. In this case a waveguide assembly or ribbon of waveguides 4 is positioned in a connector which includes a grooved micro-machined fixture or bench 6, which together with a slotted cover piece 5 forms a cavity comprising a series of etched grooves 10 into which the waveguide ribbon 4 is inserted. The optical bench fixture comprises a base with a series of parallel groves which match the number ($\geq 2$) and the spacing of the waveguides in the ribbon. The optical bench is formed by grooving or notching a rigid or semi-rigid material with precisely placed channels where for multimode applications the perpendicular distance between adjacent channels is held to at least 5 microns within specification and preferable to within 1 micron or less of specification, and for single mode applications is held to at least 1 micron within specification and preferable to within 0.1 micron or less. Material from which the optical bench is fabricated can vary widely and can comprise glass, plastics, metals, ceramics, and semiconductors. A preferred material is single-crystal silicon. Such a material can be masked and etched by conventional techniques to produce the required precisely placed channels. Lateral alignment within the fixture is achieved by contacting the sides of the plateaus and/or the sides of the waveguides with the sloping walls of the etched grooves 10. Vertical alignment is achieved by the constraint of the substrate 2 between the bench 6 and the cover plate 5. The vertical alignment of the waveguide, which is critical, is achieved by controlling the height (thickness) of the waveguide core and the plateau with respect to the surface of the bench as a reference. Lateral alignment is ensured by the waveguide or the plateau having a height and width such that the edge of either or both just touch the wall of the groove in the bench. It is preferred that either the plateau or the waveguide be undersized with respect to their width such that only one will serve as the alignment feature. For the V-grooved optical bench shown in FIG. 2 it is necessary to control both the height and the width of the feature which is controlling the alignment function (plateau or waveguide). In one embodiment of the invention, the waveguide assembly is positioned in the grooves 10 of bench 6 and then cover plate 5 is attached on top. In another embodiment, bench 6 and cover plate 5 are pre-bonded or are a single piece monolithic construction and grooves and cover plate slot 9 are milled out, molded, or the like. The waveguide assembly is then slid into the grooves 10 and slot 9. It is preferable that the waveguides and the plateaus, if present, are comprised of a flexible material which can deform slightly to conform with the precisely aligned grooves of the bench. In such event, small errors in the positioning of the waveguides, and their plateaus can be corrected. Covers for the optical bench are optionally employed to form a rectangular cross-section channel into which the waveguide ribbon may be inserted. Covers may be fabricated from any of a number of rigid materials such as glass, plastics, metals, ceramics, and semiconductors. The preferred material for the cover is clear glass, which can be conveniently bonded directly to the silicon optical bench. The required channel in the cover, depending on the choice of material, can be formed by a variety of techniques such as extruding, molding, embossing, grinding, milling and cutting. When the cover is glass, the preferred method for forming the channel is grinding.

Figure 3:
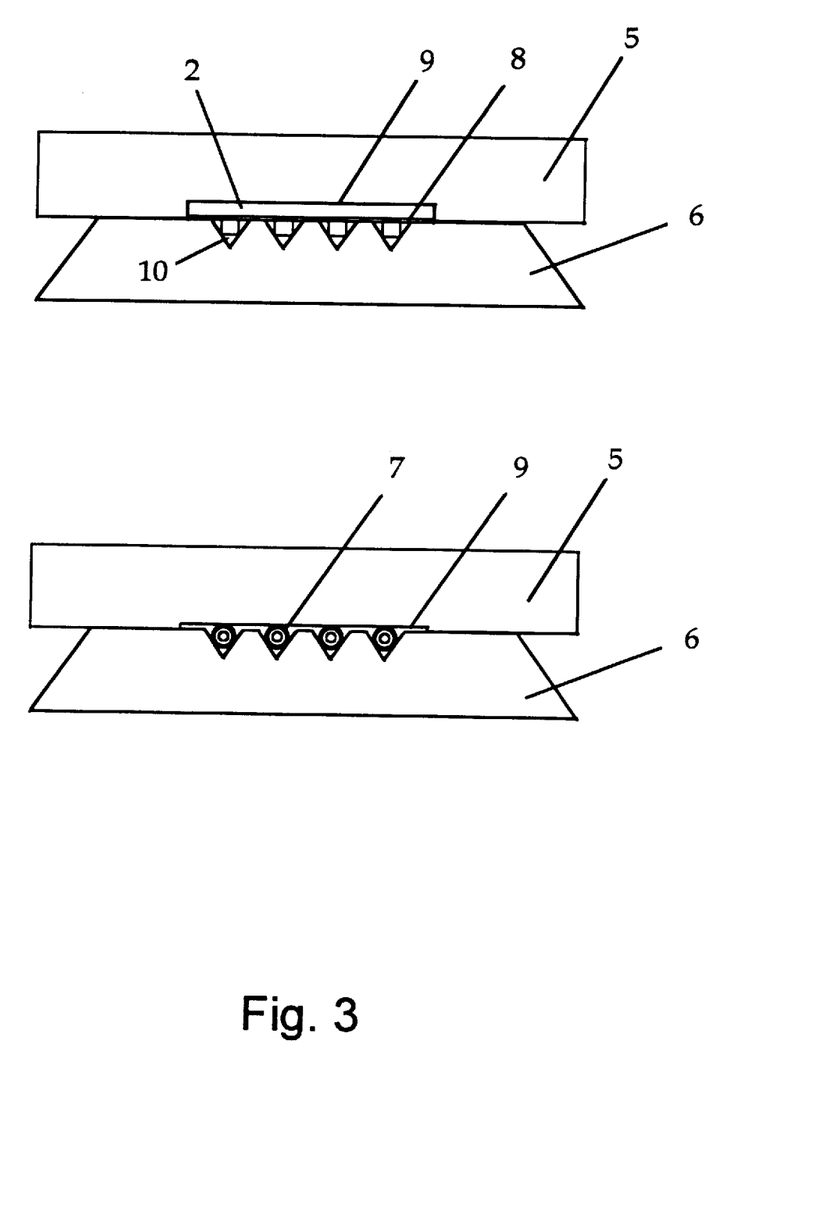
FIG. 3 shows a waveguide ribbon with a uniform buffer layer underlying waveguides and the ribbon inserted into a connector alignment fixture.
Figure 4:
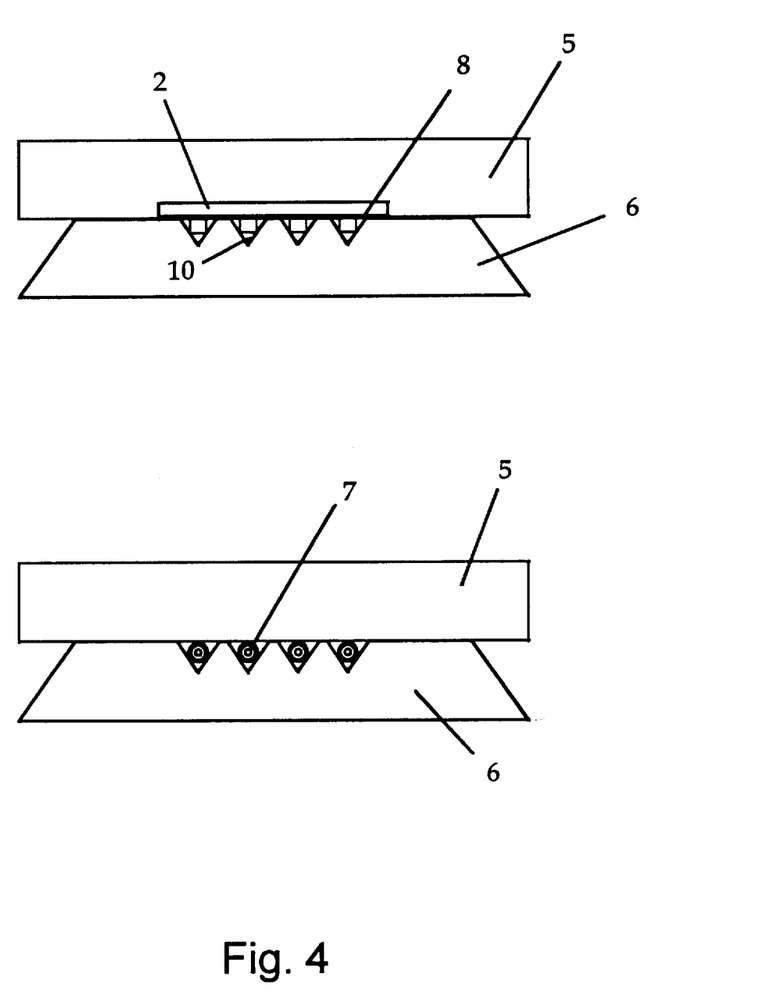
FIG. 4 shows a waveguide ribbon with a uniform buffer layer underlying waveguides and the ribbon inserted into another connector alignment fixture.
Figure 6:
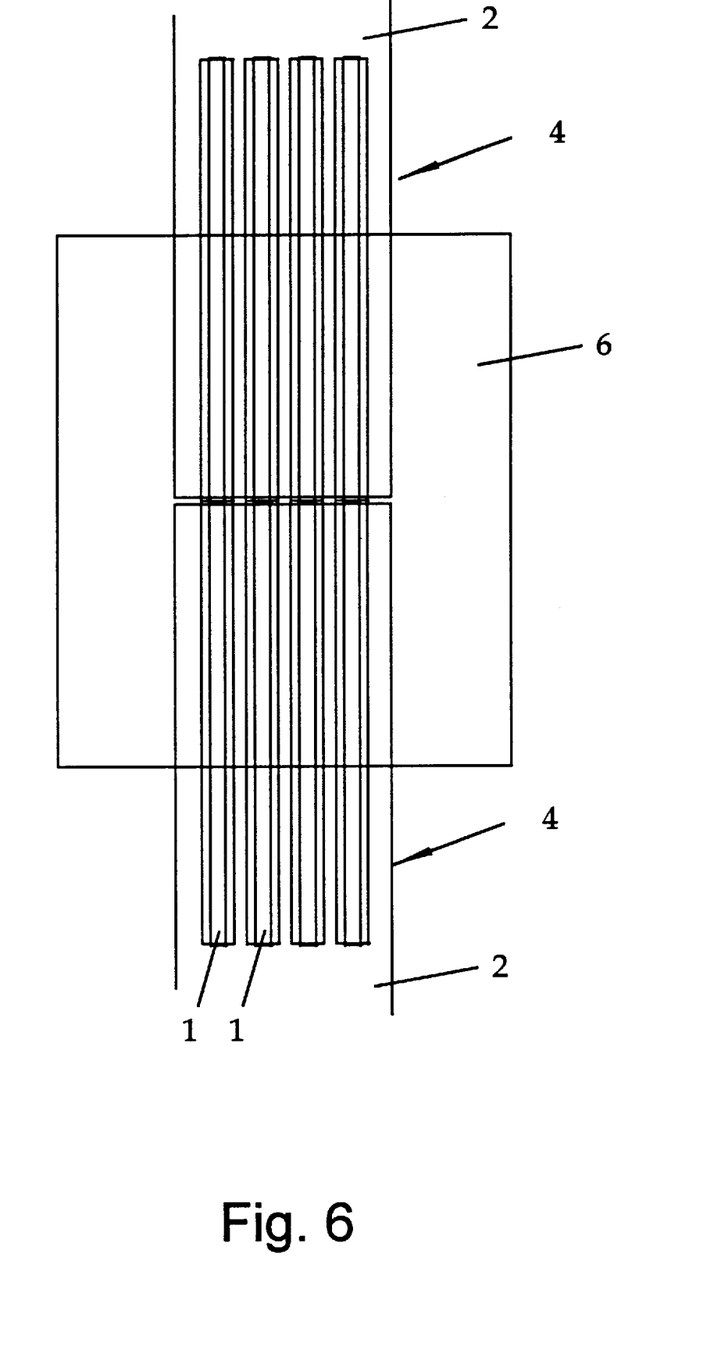
FIG. 6 shows two waveguide ribbons spliced together in a single connector.

In one embodiment of the invention, as shown in FIG. 6, two waveguide assemblies can be spliced together. A first waveguide assembly can be spliced to a second waveguide assembly by closely positioning the ends of each of the waveguides on one waveguide assembly to those of corresponding ends of the waveguides of another waveguide assembly in the grooves and slot between a single bench and cover. In another embodiment, the a waveguide assembly can be spliced in a similar fashion to a plurality of optical fibers. FIGS. 2 through 4 show a bench and cover plate both with a waveguide assembly and a series of optical fibers.

When it is desired to interface the waveguide with glass or polymer fiber 7 within the two halves of the connector, it is advantageous, in order to minimize interconnection losses, to match the numerical aperture (NA) of the waveguide to that of the glass fiber. Conventional multi-mode glass fiber generally possess a numerical aperture (NA) near either 0.22 or 0.29. If $n_1$ is the index of refraction of the waveguide core and $n_2$ is the index of the cladding and the buffer, then the NA equals $(n_1^2-n_2^2)^{1/2}$. For a given value of $n_1$ the formulations for the cladding and the buffer polymers are adjusted to give a value of $n_2$ which leads to the desired NA.

Final assembly of the device requires insertion of the completed waveguide ribbon into the alignment fixture (optical bench and cover), preferably followed by adhesively bonding the ribbon within the fixture. The bonding may be accomplished by providing a "glue hole" through the cover and adding glue through this hole once the ribbon has been inserted. In this method the adhesive contacts the substrate and the cover and does not migrate to the waveguide side. It may, in some instances, be advantageous to apply adhesive to the waveguides themselves before insertion. In this case if the waveguides do not already possess a separate cladding, then the adhesive itself will fill this function and must then meet the materials requirements of a cladding, that is, the index of refraction of the adhesive ($n_2$) should preferably be less than that of the waveguide ($n_1$) and more preferably be such that it produces a waveguide with the desired NA.

Figure 5:
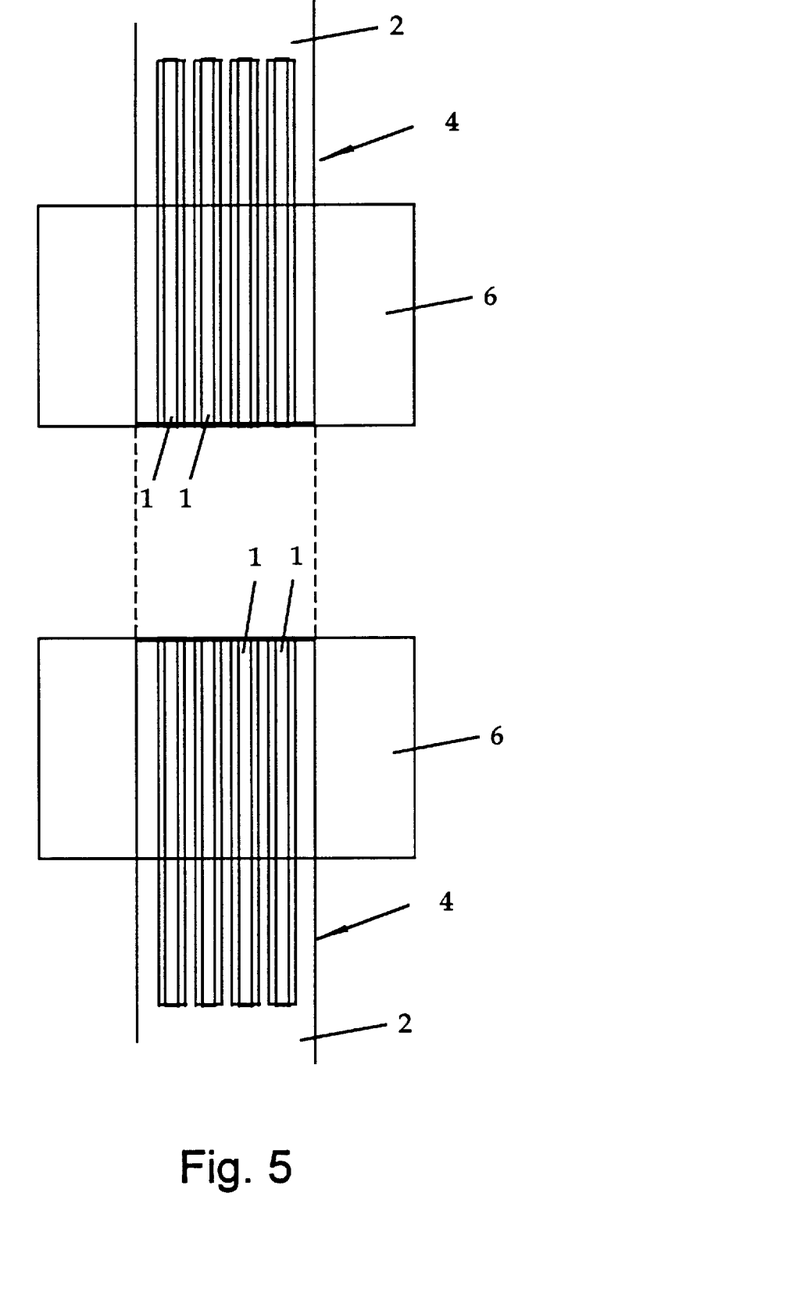
FIG. 5 shows two waveguide ribbons attached to two connectors and the two connectors in proximity to each other prior to being attached together.

In yet another embodiment of the invention, a waveguide assembly can be fixed in a bench and cover and attached to a corresponding second waveguide assembly in a second bench and cover. As shown in FIG. 5, a first waveguide assembly can be fixed within a first bench and cover and a second waveguide assembly or an array of optical fibers can be fixed within a second bench and cover. Thereafter the first and second bench and cover combinations are attached to one another by physically mating the two bench and cover assemblies, such that the waveguide ends are aligned. FIG. 2, shows a first waveguide assembly fixed within a first bench and cover and an array of optical fibers can be fixed within a second bench and cover. The fiber may also have a buffer coating material, for example an acrylic or polyimide. If the corresponding benches of both connector halves are aligned upon mating, then the vertical alignment of the light conducting waveguides is ensured by the appropriate choice of plateau height. The alignment of one optical bench to the other within the connector can be achieved by a variety of means. One preferred method is to use pins or rails to engage outer grooves formed by the sloping wall of the bench and the bottom surface of the top cover of the alignment fixture. The two connectors may either be permanently mated or may be de-mateable. The co-linear (co-axial) alignment of the corresponding waveguides and/or fibers in the assembled connector is critical. It is also critical that the end faces of the waveguides in the two connector halves be in close proximity when the connector is mated to accomplish this requirement. It is critical that the waveguide ribbon be inserted in its corresponding alignment fixture to a depth such that the end face of the waveguide core is flush to the end of the alignment element. The core and the end face of the alignment element for multimode applications are preferably flush to within 10 microns and more preferably flush to within 5 microns, and for single mode applications are flush to within 3 microns and more preferably to within 1 micron. This condition may be accomplished by accurate insertion using visual inspection means, or it may be accomplished by inserting the ribbon so that it protrudes by a small amount, and then cutting or polishing the ribbon back to the level of the end face of the alignment fixture (the bench and its cover).

As shown in FIG. 2, each waveguide is provided with a discrete plateau 3. For manufacturing simplicity and lower cost, it is generally desirable to adopt a design which eliminates the plateau from the structure in favor of a uniformly thick underlayer or buffer coating, 8 as shown in FIGS. 3 and 4. The purpose of the discrete plateau structure is to compensate for the thickness of the cladding and optional jacketing on a glass or polymer fiber 7 having a round or elliptical cross-section. When a direct waveguide to waveguide interconnection is desired within a de-mateable connector, the plateau layer can be eliminated. An alternative alignment scheme can also be adopted for a connector designed to interface ribbed polymer waveguides with clad or jacketed glass or polymer fiber. If the plateau layer is eliminated, either the position of the fibers can be adjusted by making the grooves in the optical bench less deep and slotting the cover plate as shown in FIG. 3, or the relative alignment of the optical benches within the two connector halves can be offset by an amount to compensate for the thickness of the fiber as shown in FIG. 4. This scheme allows for the use of a simpler construction for the ribbed waveguide without need for a discrete plateau, which in turn eliminates a costly manufacturing step. In this case lateral alignment is accomplished by the lateral cladding of the waveguides contacting the walls of the grooves in the bench.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLES

To synthesize the crosslinked photopolymers, the monomers or the oligomers were mixed with the photoinitiators and the antioxidant and well stirred. The solutions obtained were coated into thin liquid films by spin coating, slot coating or direct liquid casting with appropriate spacers. The thickness of the film was controlled by spinning speed or spacer thickness. The liquid films were placed in a sealed box of controlled atmosphere and photocured with an Oriel mercury xenon lamp (1000W) for 15 seconds in air and then 60 seconds in nitrogen. The thickness of the films below 50 mm was measured with a Sloan Dektak IIA profilometer and the thickness of the thicker films were measured with a microscope.

Example 1

A mixture containing 20.0 g ethoxylated bisphenol A diacrylate (EBDA, n=1–2 in formula I), 10.0 g 1,6-hexanediol diacrylate (HDDA), 0.6 g photoinitiator Irgacure 651, and 0.09 g antioxidant Irganox 1010 was vigorously stirred for 1 h at 60° C. to form a homogeneous solution. The solution was then coated on a substrate and cured under a mercury Xenon lamp. The coated substrate was then placed in an air purged oven and thermally baked at 190° C. for 48 h. The sample remained colorless, corresponding to Gardner color index of 1, as described by ASTM D1544-80, and there were no delamination from the substrate and no cracking in the polymer layer. The glass transition temperature measured by dynamic mechanical analysis (DMA) was 40° C.

Example 2

A mixture containing 20.0 g ethoxylated bisphenol A diacrylate (EBDA, n=10 in formula I), 10.0 g tripropylene glycol diacrylate (TPGDA), 0.6 g photoinitiator Irgacure 651, and 0.09 g antioxidant Irganox 1010 was vigorously stirred for 1 h at 60° C. to form a homogeneous solution. The solution was then coated on a substrate and cured under a mercury Xenon lamp. The glass transition temperature measured by dynamic mechanical analysis (DMA) was 10° C. The coated substrate was placed in an air purged oven and thermally baked at 190° C. for 48 h. The sample was slightly yellowish, corresponding to Gardner color index of 2, as described by ASTM D1544-80, and there were no delamination from the substrate and no cracking in the polymer layer.

Example 3

On a clean glass substrate is coated a layer of photopolymerizable composition given in Example 1. The thickness of the layer ranges from about 5 to 500 micrometers in order to form a device which is compatible with conventional glass and plastic optical fibers for low insertion loss. The photopolymerizable layer is then exposed to a beam of ultraviolet light using a mercury xenon lamp from Oriel through a photomask, which defines the desired feature and geometry of the final waveguiding device. The imagewise exposed film is developed with propanol to form a light guiding core structure. A second polymerizable composition given in Example 2 having lower refractive index than the core, is coated and blanket exposed to form a cladding layer. Subsequently, the device is baked in a nitrogen purged oven at 120° C. for 1 h.

Example 4

The photopolymerizable composition given in Example 2 is spin coated on a polyimide film substrate and blanket exposed to a beam of ultraviolet light to cure the liquid monomer composition into a solid thin film as a buffer layer. The composition given in Example 1 is then coated on top of the buffer layer as a core layer. The thickness of the core layer ranges from about 5 to 500 micrometers in order to form a device which is compatible with convention glass and plastic optical fibers for low insertion loss. The photopolymerizable core layer is then exposed to a beam of ultraviolet light through a photomask, which defines the desired feature and geometry of the final waveguiding device. The imagewise exposed film is developed with propanol to form a light guiding core structure. The polymerizable composition given in Example 2 is coated on top of the imaged core layer and blanket exposed to form a cladding layer. Subsequently, the device is baked in a nitrogen purged oven at 120° C. for 1 h.

Example 5

The photopolymerizable composition given in Example 2 is spin coated on a silicon wafer and blanket exposed to a beam of ultraviolet light to cure the liquid monomer composition into a solid thin film as a buffer layer. The composition given in Example 1 is coated on top of the buffer layer as a core layer. The photopolymerizable core layer is then exposed to a beam of ultraviolet light through a photomask, which defines the desired feature and geometry of the final waveguiding device. The imagewise exposed film is developed with propanol to form a light guiding core structure. The polymerizable composition given in Example 2 is coated on top of the imaged core layer and exposed to a beam of ultraviolet light through a photomask, which defines the desired geometry of the final cladding layer so that it, after developing with propanol, envelopes the core structure. Subsequently, the device is baked in a nitrogen purged oven at 120° C. for 1 h.

Example 6

A quantity of alignment fixtures were prepared which consisted of a grooved silicon wafer section (herein referred to as a silicon optical bench, element 6 in FIG. 2) and a glass cover plate (element 5 in FIG. 2). A roughly rectangular channel with a cross section of about 2 mm by about 0.127 mm was ground into the glass cover plate and the ground side of the plate was bonded directly onto the grooved side of the silicon bench to from a grooved channel running the full length of the piece. The grooves were made deeper along one edge of the silicon in order to facilitate the insertion of a waveguide ribbon strip. The dimensions of the channel at the other end of the strip are critical to achieving alignment of the light guiding cores of the waveguide and were measured to give the results in Table 1.

TABLE 1

| Dimensions of Alignment Fixtures in $\mu$m | | | | | |
|---|---|---|---|---|---|
| | S* | D* | W | r | L |
| Target Specifications: Sample #, Channel # | >127 | 247 | 350 | 0 | 225 |
| 1,1 | | 230 | 354 | 29 | |
| 1,2 | 128 | 252 | 351 | | |
| 1,4 | 125 | 240 | | | |
| 2,1 | 132.5 | 246 | | | 191 |
| 2,2 | 134 | | | | |
| 2,4 | 131 | | | 24 | 260 |
| 3,1 | 127 | 245 | | 23 | |
| 3,3 | 127 | 244 | | | |
| 3,4 | 129 | 242 | | 31 | |
| 4,1 | 136 | 245 | 347 | 25 | 140 |
| 4,4 | 137 | 240 | | | 283 |
| 5,1 | 131 | 243 | | | 185 |
| 5,4 | 134 | 246 | 350 | 39 | 276 |

*Glass-Si interface used to establish zero reference for measurement
In Table 1, S = slot height, D = Groove depth, W = groove width, r = radius of slot edge in glass, L = distance from nearest groove edge to edge of slot

Example 7

A waveguide ribbon was prepared on a 127-$\mu$m thick polyimide film substrate. The ribbon consisted of four parallel guides on 400-$\mu$m centers which were centered on four plateaus and over-printed with an aligned cladding structure. The guides were produced from a transparent photopolymerized acrylate polymer. The fabrication process required the fabrication of three layers on the polyimide substrate. The substrate film was first laminated to a glass slide using a low-adhesive-strength pressure sensitive adhesive (PSA). The first layer (the plateau) was built by exposing an approximately 39-micron-thick layer of monomer through a mask designed to produce the required plateau structure (4 parallel lines of 288-$\mu$m width). After development of the first layer by washing away unexposed monomer with acetone, the second layer was produced from a monomer layer which was approximately 131 $\mu$m thick (measured with respect to the surface of the substrate). This core layer was produced from a second mask which was precisely aligned with the already printed plateau structure. After development of the second layer, a third layer was produced from a layer of monomer which was 150 $\mu$m thick. This cladding layer was fabricated by exposure through a third mask which was again precisely aligned with the already printed core structure. The polyimide film substrate containing the printed structures was then peeled from the glass slide and was cut to an appropriate width (less than 2 mm, the slot width dimension in Example 6) to ensure that the polyimide film edges would not control or interfere with the accurate alignment of the ribbon inside the fixture of Example 6. The final waveguide ribbon was configured as depicted in FIG. 1. Measurement of the dimensions of the structure with the aid of a microscope gave the following results:

TABLE 2

| Parameter | Measured ($\mu$m) | Target ($\mu$m) | Mask Feature Dimension ($\mu$m) |
|---|---|---|---|
| Cladding Height | 154 | 150 | — |
| WG Height | 126 | 131 | — |
| Plateau Height | 39 | 39 | — |
| Cladding Width | 134 | 135 | 140 |
| WG Width | 90 | 92 | 100 |
| Plateau Width | 288 | <287 | 288 |
| Cladding-WG Offset | 5 | ≦5 | — |

The last row of the table pertains to the offset, in two-dimensional projection, between the geometrical centers of the cladding and the waveguide core. This offset was kept sufficiently small to satisfy our requirements for this multi-mode guide of nominal 92-$\mu$m width.

Example 8

The waveguide ribbon of Example 7 was inserted into the alignment fixture of Example 6. The fit was found to be tight with no observable play. The waveguide core was found to be in the appropriate position with respect to the alignment surfaces of the silicon optical bench. It was observed that the ribbon could be removed and re-inserted several times without damage.

What is claimed is:

1. An optical waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core.

2. The optical waveguide assembly of claim 1 wherein each core has a polygonal cross section defined by a plurality of flat edges.

3. The optical waveguide assembly of claim 1 wherein each core has a substantially rectangular cross section.

4. The optical waveguide assembly of claim 1 wherein the cross section of each cladding has the contour of a symmetrical bell-shaped Gaussian curve around each core.

5. The optical waveguide assembly of claim 1 wherein the thickness of each cladding is not more than the thickness of each core.

6. The optical waveguide assembly of claim 1 wherein the thickness of each cladding ranges from about 1 micrometer to about 100 micrometers.

7. The optical waveguide assembly of claim 1 wherein the thickness of each cladding ranges from about 3 micrometers to about 50 micrometers.

8. The optical waveguide assembly of claim 1 which comprises a plurality of said substantially transparent, shaped polymeric cores, each having a plurality of edges, which cores are attached on and raised from a surface of the substrate on one edge of each core, and a shaped, polymeric cladding attached on and in conforming register with each other edge of each core such that each cladding has a shape substantially congruent with the shape of each core; each core and cladding being separated and spaced from each other core and cladding.

9. The optical waveguide assembly of claim 1 wherein each polymeric core comprises a material having a glass transition temperature of about 80° C. or less and each polymeric cladding comprises a material having a glass transition temperature of about 60° C. or less.

10. The optical waveguide assembly of claim 1 wherein each polymeric core comprises a material having a glass transition temperature of about 50° C. or less and each polymeric cladding comprises a material having a glass transition temperature of about 25° C. or less.

11. The optical waveguide assembly of claim 1 further comprising a light reflecting buffer layer between the substrate and said one edge of the core, said buffer layer comprising a polymeric material having a glass transition temperature of about 60° C. or less.

12. The optical element of claim 1 wherein said substrate is selected from the group consisting of silicon, silicon oxide, gallium arsenide, silicon nitride, glass, quartz, plastics, ceramics and crystalline materials.

13. A waveguide connector assembly which comprises
(a) a base having at least one channel defined by walls cut along a surface of the base;
(b) a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core; the waveguide assembly being positioned on the base such that each waveguide is positioned in one of the channels and contacts the walls of the channel at two or more points;
(c) a cover plate on the waveguide assembly.

14. The waveguide connector assembly of claim 13 wherein the channels are triangular.

15. The waveguide connector assembly of claim 13 wherein the waveguide cross section has the shape of a rectangle or trapezoid.

16. The waveguide connector assembly of claim 13 wherein the waveguide assembly is flexible.

17. The waveguide connector assembly of claim 13 comprising a plurality of waveguides on the substrate which are substantially parallel to one another.

18. The waveguide connector assembly of claim 13 wherein the base and the cover plate are fixed together.

19. The waveguide connector assembly of claim 13 wherein the base and the cover plate comprise materials selected from the group consisting of glass and silicon.

20. The waveguide connector assembly of claim 13 wherein the base and the cover plate are a single piece monolithic construction and comprises a polymeric material.

21. The waveguide connector assembly of claim 13 further comprising a plateau between each waveguide and the substrate.

22. The waveguide connector assembly of claim 13 further comprising a plurality of plateaus, and a plurality of waveguides, wherein one plateau is positioned between each waveguide and the substrate.

23. The waveguide connector assembly of claim 22 wherein each plateau is positioned in one of the channels and contacts the walls of the channel.

24. The waveguide connector assembly of claim 13 wherein the substrate is positioned in a slot in a surface of the cover plate.

25. The waveguide connector assembly of claim 13 further comprising a plurality of optical fibers positioned on the base such that an optical fiber is positioned in each of the channels and contacts the walls of the channel; the waveguide assembly and the optical fibers being positioned such that each of the waveguides is aligned and in juxtaposition with one of the optical fibers.

26. The waveguide connector assembly of claim 13 further comprising a second waveguide assembly, the second waveguide assembly comprising a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core; the second waveguide assembly being positioned on the base such that each second waveguide is positioned in one of the channels and contacts the walls of the channel; the waveguide assembly and the second waveguide assembly being positioned such that each waveguide is aligned and in juxtaposition with one second waveguide.

27. The waveguide connector assembly of claim 26 wherein each of the waveguides is contacted with one of the second waveguides.

28. The waveguide connector assembly of claim 26 wherein each of the waveguides and the second waveguides have substantially the same cross section.

29. The waveguide connector assembly of claim 26 further comprising a plateau between each second waveguide and the second substrate.

30. The waveguide connector assembly of claim 26 further comprising a plurality of plateaus and a plurality of waveguides, wherein, one plateau is positioned between each second waveguide and the second substrate.

31. The waveguide connector assembly of claim 30 wherein each plateau is positioned in one of the channels and contacts the walls of the channel.

32. The waveguide connector assembly of claim 26 wherein the second substrate is positioned in a slot in a surface of the cover plate.

33. A method for aligning a first waveguide assembly to a second waveguide assembly which comprises
(a) providing a waveguide connector comprising a base having a plurality of substantially parallel channels defined by walls cut along a surface of the base and a cover plate on the base over the channels;
(b) providing first and second waveguide assemblies, each of which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;
(c) positioning the first and second waveguide assemblies on the base such that each waveguide is positioned in one of the channels and contacts the opposing walls of the channel at two or more points, and such that each waveguide on the first waveguide assembly has an end which is aligned with a corresponding end of a waveguide on the second waveguide assembly.

34. The method of claim 33 comprising covering the ends of the waveguide assemblies, the base and the channels with a flat cover plate after positioning the ends of the waveguide assemblies in the channels.

35. The method of claim 33 wherein the waveguide connector comprises a monolithic base and cover plate having a plurality of substantially parallel channels defined by walls cut therethrough and the method comprises sliding the ends of the waveguide assemblies into the channels.

36. A method for aligning a waveguide assembly to an optical fiber assembly which comprises
(a) providing a waveguide connector comprising a base having a plurality of substantially parallel channels defined by walls cut along a surface of the base and a cover plate on the base over the channels;
(b) providing a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;
(c) providing an optical fiber assembly which comprises a plurality of attached optical fibers;
(d) positioning the waveguide assembly and the optical fiber assembly on the base such that each waveguide and optical fiber is positioned in one of the channels and contacts the opposing walls of the channel at two or more points, and such that each of the waveguides on the waveguide assembly has an end which is aligned with a corresponding end of an optical fiber on the optical fiber assembly.

37. The method of claim 36 comprising covering the ends of the waveguide assembly, the optical fibers, the base and the channels with a flat cover plate after positioning the ends of the waveguide assembly and optical fibers in the channels.

38. The method of claim 36 wherein the waveguide connector comprises a monolithic base and cover plate having a plurality of substantially parallel channels defined by walls cut therethrough and the method comprises sliding ends of the waveguide assembly and optical fibers into the channels.

39. A method for aligning a first waveguide assembly to a second waveguide assembly which comprises
(a) providing first and second waveguide connectors each comprising a base having a plurality of substantially parallel channels defined by walls cut along a surface of the base and a cover plate on the base over the channels;

(b) providing first and second waveguide assemblies, each of which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) positioning the first and second waveguide assemblies respectively on the base of the first and second waveguide connectors such that each of the waveguides is positioned in one of the channels and contacts the opposing walls of the channel at two or more points; and (d) attaching the first waveguide connector to the second waveguide connector such that each of the waveguides on the first waveguide assembly has an end which is in substantially co-linear alignment with a corresponding end of a waveguide on the second waveguide assembly.

40. A method for aligning a first waveguide assembly at least one optical fiber, which comprises (a) providing first and second waveguide connectors each comprising a base having a plurality of substantially parallel channels defined by walls cut along a surface of the base and a cover plate on the base over the channels;

(b) providing a waveguide assembly which comprises a substrate, and at least one waveguide on the substrate, each said waveguide comprising a substantially transparent, shaped polymeric core having a plurality of edges, which core is attached on and raised from a surface of the substrate on one edge of the core, and a shaped, polymeric, light reflecting cladding attached on and in substantially conforming registration with each other edge of the core such that the cladding has a shape substantially congruent with the shape of the core and wherein the refractive index of the cladding is less than the refractive index of the core;

(c) providing an optical fiber assembly which comprises at least one optical fiber;

(d) positioning the waveguide assembly respectively on the base of the first waveguide connector such that each waveguide is positioned in one channel and contacts the opposing walls of the channel at two or more points;

(e) positioning the optical fiber assembly respectively on the base of the second waveguide connector such that each optical fiber is positioned in one channel and contacts the walls of the channel at two or more points; and (f) attaching the first waveguide connector to the second waveguide connector such that each waveguide on the waveguide assembly has an end which is in substantially co-linear alignment with a corresponding end of an optical fiber on the optical fiber assembly.

\* \* \* \* \*